(12) United States Patent
Peng et al.

(10) Patent No.: US 10,581,733 B2
(45) Date of Patent: Mar. 3, 2020

(54) METHODS AND DEVICES FOR CONSTRUCTING LABEL AND FORWARDING LABEL PACKET

(71) Applicant: ZTE Corporation, Shenzhen (CN)

(72) Inventors: Shaofu Peng, Shenzhen (CN); Ran Chen, Shenzhen (CN); Ting Liao, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 6 days.

(21) Appl. No.: 15/544,749

(22) PCT Filed: Jun. 24, 2015

(86) PCT No.: PCT/CN2015/082236
§ 371 (c)(1),
(2) Date: Jul. 19, 2017

(87) PCT Pub. No.: WO2016/115823
PCT Pub. Date: Jul. 28, 2016

(65) Prior Publication Data
US 2018/0019944 A1      Jan. 18, 2018

(30) Foreign Application Priority Data
Jan. 19, 2015  (CN) .......................... 2015 1 0026562

(51) Int. Cl.
*H04L 12/723* (2013.01)
*H04L 12/741* (2013.01)
*H04L 12/913* (2013.01)

(52) U.S. Cl.
CPC ............ *H04L 45/507* (2013.01); *H04L 45/54* (2013.01); *H04L 47/724* (2013.01)

(58) Field of Classification Search
CPC ....... H04L 45/507; H04L 45/34; H04L 45/50; H04L 45/54; H04L 47/724
See application file for complete search history.

(56) References Cited

U.S. PATENT DOCUMENTS

2014/0169370 A1*  6/2014  Filsfils ................. H04L 69/166
                                                           370/392
2014/0369356 A1    12/2014  Bryant et al.
(Continued)

FOREIGN PATENT DOCUMENTS

| CN | 101243654 A | 8/2008 |
|---|---|---|
| CN | 101771561 A | 7/2010 |
| CN | 103124236 A | 5/2013 |

OTHER PUBLICATIONS

S. Previdi et al. "Segment Routing with IS-IS Routing Protocol Draft-previdi-filsfils-isis-segment-routing-02", Internet Draft, Mar. 20, 2013; pp. 1-27.
(Continued)

*Primary Examiner* — Albert T Chou
(74) *Attorney, Agent, or Firm* — Cantor Colburn LLP

(57) ABSTRACT

Methods and devices for constructing a label and forwarding a label packet are provided. A node receives a message which carries a segment list and a segment list Identifier (ID) for identifying the segment list. The node constructs a label forwarding table according to the segment list and the segment list ID, and performs forwarding according to the label forwarding table; and/or the node maintains a mapping relationship between the segment list and the segment list ID.

18 Claims, 7 Drawing Sheets

(56) References Cited

U.S. PATENT DOCUMENTS

| | | | | |
|---|---|---|---|---|
| 2015/0256456 A1* | 9/2015 | Previdi | ................ | H04L 45/745 |
| | | | | 370/392 |
| 2015/0304206 A1* | 10/2015 | Filsfils | ................... | H04L 45/04 |
| | | | | 709/238 |
| 2015/0326675 A1* | 11/2015 | Kini | ....................... | H04L 67/16 |
| | | | | 709/224 |
| 2017/0126435 A1* | 5/2017 | Benny | ................ | H04L 12/4675 |
| 2017/0302561 A1* | 10/2017 | Filsfils | ................... | H04L 41/12 |

OTHER PUBLICATIONS

International Search Report dated Oct. 14, 2015 re: Application No. PCT/CN2015/082236; pp. 1-2; citing: CN 101243654 A, CN 101771561 A, CN 103124236 A and S. Previdi et al. "Segment Routing . . .".

Written Opinion dated Oct. 14, 2015 re: Application No. PCT/CN2015/082236; pp. 1-4; citing: CN 101243654 A and S. Previdi et al. "Segment Routing . . .".

C. Filsfils, et al. "Segment Routing Architecture; draft-ietf-spring-segment-routing-00.txt", Internet Engineering Task Force, IETF; Standardworkingdraft, internet society (ISOC), Nov. 25, 2014, pp. 1-18, XP015103368.

Extended European Search Report dated Dec. 20, 2017 re: Application No. 15878495.9—PCT/CN2015082236, pp. 1-9, citing: US 2014/369356 A1, S. Sivabalan et al. "PCEP Extensions . . ." and C. Filsfils et al. "Segment Routing . . .".

S. Sivabalan et al. "PCEP Extensions for Segment Routing draft-ietf-pce-segment-routig-00.txt", Internet Engineering Task Force, IETF; Standardworkingdraft, Internet Society (ISOC), Oct. 26, 2014, pp. 1-18, XP015102578.

\* cited by examiner

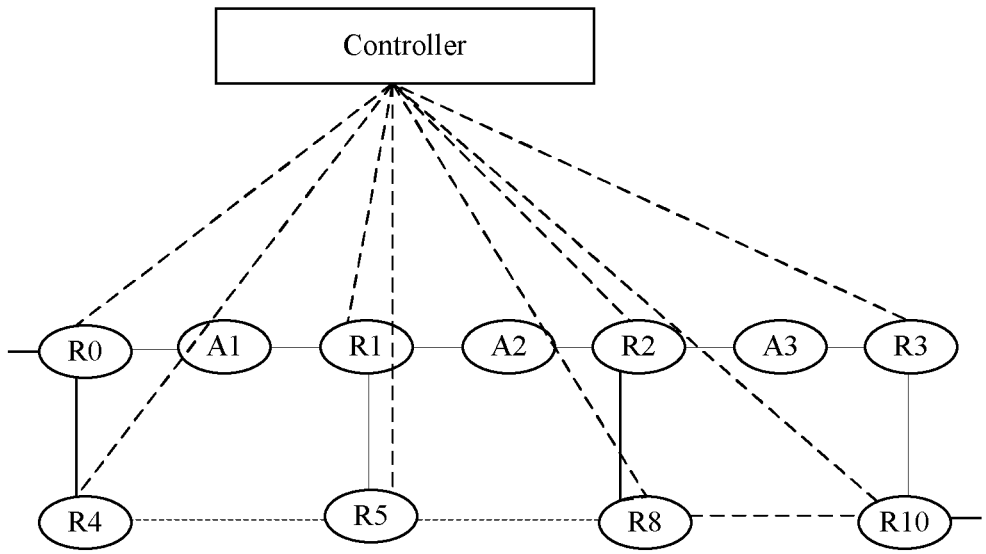
Fig. 10
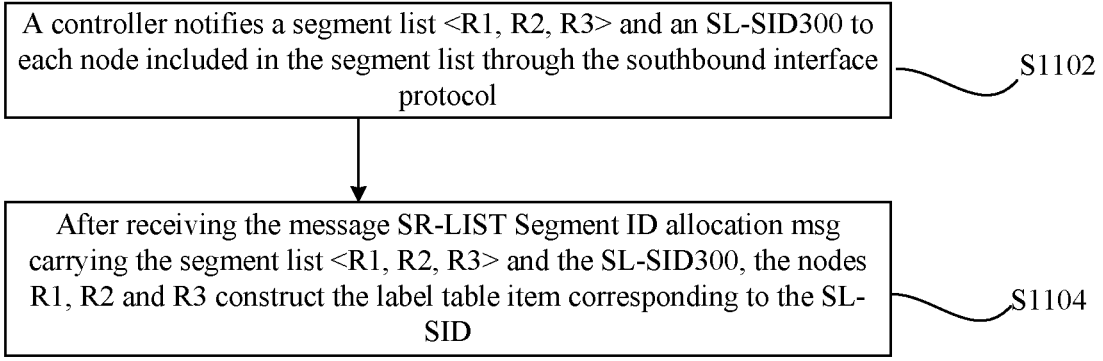
Fig. 11
| N Input label | Output label | Nexthop | Interface |
|---|---|---|---|
| SRGB_R1[300] | SRGB_R2[300] | Remote R2 | Null |
Fig. 12

| Input label | Output label | Nexthop | Interface |
|---|---|---|---|
| SRGB_R2[300] | SRGB_A3 [index_R3] | Direct A3 | Port 1 |

Fig. 13

| Input label | Output label | Nexthop | Interface |
|---|---|---|---|
| SRGB_R3 [index_R3] | pop | Hop back | Hop back |

Fig. 14

| | |
|---|---|
| SRGB_A1[INDEX_R1], SRGB_R1[300] | Data packet |

Fig. 15

| | |
|---|---|
| SRGB_R1[300] | Data packet |

Fig. 16

| | |
|---|---|
| SRGB_A2[index_R2], SRGB_R2[300] | Data packet |

Fig. 17

| | |
|---|---|
| SRGB_R2[300] | Data packet |

Fig. 18

METHODS AND DEVICES FOR CONSTRUCTING LABEL AND FORWARDING LABEL PACKET

TECHNICAL FIELD

The disclosure relates to the communication field, in particular to methods and devices for constructing a label and forwarding a label packet.

BACKGROUND

A typical service bearer network may include a Customer Edge (CE) router, a Provider Edge (PE) router, a provider backbone router and a Route Reflector (RR). Generally, an Open Shortest Path first (OSPF) protocol/Intermediate System to Intermediate System Routing Protocol (IS-IS) is adopted as an Interior Gateway Protocol (IGP). A BGP-4 Multiple Protocol Border Gateway Protocol (MP-BGP) is adopted to transfer Virtual Private Network (VPN) information. A Label Distribution Protocol (LDP) is adopted to distribute a label, and a Resource Reservation Protocol-Traffic Engineering (RSVP-TE) is adopted to deploy traffic engineering and bandwidth reservation for a specific application or a destination service. However, the deployment of the typical service bearer network has several problems as follows. There are many routing protocols, and the deployment is complex. Because a forwarding mechanism is based on a destination address, a data packet cannot be forwarded based on the demand of each source end. The source end cannot be dynamically deployed according to a network condition when satisfying the demand on bandwidth and delay of the specific application, and cannot automatically adjust a forwarding path when a certain link in the network is congested. The RSVP may realize bandwidth reservation, but static configuration, rather than dynamic configuration, is generally adopted in actual deployment. In addition, for realizing a perfect bandwidth guarantee, it may be needed to deploy a full-mesh RSV-TE, so the resource consumption is high. Although the RSVP technology is matured, the proportion of actual deployment is very low.

Based on the above problems, the Internet Engineering Task Force (IETF) puts forward a Segment Routing (SR) technology. The SR is a method for routing based on a source address, by superposing a layer of SR information influencing the existing shortest path forwarding outside the data packet, the data packet may be forwarded along the shortest path according to information of these specified path nodes. The SR information is mainly composed of a SR Global Block (SRGB) and an index of the node. The index of each node is unique, and the node may be identified by offsetting in the scope of SRGB according to the index. By means of an SR specified path forwarding function, load balancing and traffic engineering of the network, and fast rerouting and other complex network functions may be realized conveniently.

That is, on a data plane, a source node directs packet forwarding through a segment list; while for a Multi-Protocol Label Switching (MPLS) forwarding plane, the segment list is converted into a traditional label stack and inserted in a packet header sent by the source node.

However, because very long segment information may be supported, it may be needed to convert the information into a very deep label stack, which causes the following two problems.

1. It may be needed to upgrade forwarding plane hardware to support a greater label stack processing capacity.

2. A problem of load efficiency and a Maximum Transmission Unit (MTU) problem may exist.

Aiming at the above problems, an effective solution has not been presented.

SUMMARY

Some embodiments of the disclosure provide methods and devices for constructing a label and forwarding a label packet, which may at least solve a problem of needing to upgrade forwarding plane hardware to support a greater label stack processing capacity, and a problem of load efficiency and an MTU problem.

According to an embodiment of the disclosure, a method for constructing a label and forwarding a label packet is provided, which may include the following acts. A node receives a message which carries a segment list and a segment list Identifier (ID) for identifying the segment list. The node constructs a label forwarding table according to the segment list and the segment list ID, and performs forwarding according to the label forwarding table; and/or the node maintains a mapping relationship between the segment list and the segment list ID.

In an embodiment, the message may be sent by an ingress node after the ingress node receives the segment list and the segment list ID sent by a controller; and/or, the message may be sent by the controller.

In an embodiment, the node may receive the message that the controller sends through a southbound interface protocol; and/or, the node may receive the message that the ingress node sends through an extended IGP.

In an embodiment, the southbound interface protocol may include: Broader Gateway Protocol-Link State (BGP-LS), Path Computation Element Communication Protocol (PCEP), open flow protocol (OPENFLOW) or network configuration protocol (Netconf).

In an embodiment, the method may further include the following act. The node receives a revocation message sent by a controller or an ingress node. The revocation message is used for indicating the node to delete the mapping relationship between the segment list and the segment list ID, and/or is used for indicating the node to delete the label forwarding table.

In an embodiment, when the node is a last node in the segment list and a previous node of the node does not carry an inner label in a forwarding packet, the node does not construct a label table item in the label forwarding table. In this embodiment, the inner label may be constructed according to an SRGB of a next node of the node and the segment list ID.

In an embodiment, the segment list ID may be a global label or an index, and the global label may be an index offset when SRGBs of all nodes in an SR domain are the same.

In an embodiment, when the segment list ID is an index and the node is not a last node, the node constructs an ingress label according to an SRGB of the node and the segment list ID, and constructs an egress label stack which includes at least one of the followings: an inner label, or one or more outer labels. The inner label may be constructed according to an SRGB of a next node of the node and the segment list ID. The one or more outer labels may include at least one of the followings: a label corresponding to a node ID to which each remaining node corresponds, or a label corresponding to a node ID to which a next node of the node corresponds.

In an embodiment, when an indicator bit indicates that an egress label is needed to be encapsulated according to a specific Readable Label Depth (RLD), the node constructs the egress label stack, which includes the one or more outer labels, according to the specific RLD.

In an embodiment, when the segment list ID is an index and the node is the ingress node, if an indicator bit indicates that an egress label is needed to be encapsulated according to a specific RLD, an ingress node constructs an egress label stack; and the egress label stack includes at least one of the followings: an inner label, or one or more outer labels. The inner label may be constructed according to the segment list ID and an SRGB of a farthest node in the segment list which is able to be encapsulated in a scope limited by the specific RLD. The one or more outer labels may be as follows from outside to inside: a label corresponding to a first node in the segment list, which is determined according to a direct connect nexthop indicated by a shortest path from the ingress node to a first node in the segment list; labels corresponding to nodes from a second node to an mth node in the segment list, each of which is determined according to a previous node of this node in the segment list. In this embodiment, the mth node may be determined according to the farthest node in the segment list which is able to be encapsulated in the scope limited by the specific RLD.

In an embodiment, when the farthest node in the segment list which is able to be encapsulated in the scope limited by the specific RLD is a last node in the segment list, the egress label stack may not include the inner label.

In an embodiment, when the segment list ID is an index and the node is the ingress node, if an indicator bit indicates that an egress label is not needed to be encapsulated according to a specific RLD, an ingress node constructs an egress label stack; and the egress label stack includes at least one of the followings: an inner label or an outer label. The inner label may be constructed according to an SRGB of a first node except the ingress node in the segment list and the segment list ID. The outer label may be determined according to a direct connect nexthop indicated by a shortest path from the ingress node to a first node except the ingress node in the segment list.

In an embodiment, when the first node except the ingress node in the segment list is also a last node in the segment list, the egress label stack may not include the inner label.

In an embodiment, when the segment list ID is an index and the node is a node except the ingress node in the segment list, if an indicator bit indicates that an egress label is not needed to be encapsulated according to a specific RLD, an egress label stack constructed by the node includes at least one of the followings: an inner label or one outer label. The inner label may be constructed according to an SRGB of a next node of the node and the segment list ID. The outer label may be constructed according to an SRGB of a direct connect nexthop indicated by a shortest path from the node to a next node of the node and an ID of the next node.

In an embodiment, when the segment list ID is an index and the node is a node except the ingress node in the segment list, if an indicator bit indicates that an egress label is needed to be encapsulated according to a specific RLD, a node i constructs an egress label stack; and the egress label stack includes at least one of the followings: an inner label, or one or more outer labels. The inner label may be constructed according to the segment list ID and an SRGB of a farthest node m in the segment list which is able to be encapsulated in a scope limited by the specific RLD. The one or more outer labels may be as follows from outside to inside: a label corresponding to a next node i+1 of the node i, which is determined according to a direct connect nexthop indicated by a shortest path from the node i to the next node i+1 of the node i; and labels corresponding to nodes from a node i+2 to a node m in the segment list, each of which is determined according to a previous node of this node in the segment list. In this embodiment, the node i may be a node except the ingress node in the segment list, and the node m may be determined according to the farthest node in the segment list which is able to be encapsulated in the scope limited by the specific RLD.

In an embodiment, when the farthest node in the segment list which is able to be encapsulated in the scope limited by the specific RLD is a last node in the segment list, the egress label stack may not include the inner label.

In an embodiment, the specific RLD may be greater than or equal to 2. When the node encapsulates a label stack of a packet, a depth of the label stack may not be greater than the specific RLD.

In an embodiment, the specific RLD may be configured explicitly, or may be a network-wide minimum value obtained by learning.

In an embodiment, nodes between the node and a next node of the node may include at least one of the followings: an SR node and/or a non-SR node; and/or, tunnels between the node and a next node of the node may include at least one of the followings: an LDP Label Switching Path (LDP LSP), an RSVP-TE LSP, a BGP LSP, or an SR LSP.

In an embodiment, when the segment list includes only one node, the segment list ID may be a node ID of the node.

According to another embodiment of the disclosure, a method for constructing a label and forwarding a label packet is also provided, which may include the following act. A controller sends a message to the node. The message carries a segment list and a segment list ID for identifying the segment list. The segment list and the segment list ID are used for indicating the node to construct the label forwarding table and perform forwarding according to the label forwarding table; and/or, the segment list and the segment list ID are used for indicating the node to maintain the mapping relationship between the segment list and the segment list ID.

In an embodiment, the act that the controller sends the message to the node may include an act that the controller sends the message to the node through a southbound interface protocol.

In an embodiment, the southbound interface protocol may include: BGP-LS, PCEP, OPENFLOW, or Netconf.

In an embodiment, after the controller sends the message to the node, the method may further include the following act. The controller sends the revocation message to the node through the southbound interface protocol. The revocation message is used for indicating the node to delete the mapping relationship between the segment list and the segment list ID, and/or is used for indicating the node to delete the label forwarding table.

According to another embodiment of the disclosure, a method for constructing a label and forwarding a label packet is also provided, which may include the following acts. An ingress node receives a message sent by a controller, and the message carries a segment list and a segment list ID for identifying the segment list. The ingress node sends the message to the node. The message is used for indicating the node to construct a label forwarding table and perform forwarding according to the label forwarding table; and/or, the message is used for indicating the node to maintain a mapping relationship between the segment list and the segment list ID.

In an embodiment, the act that the ingress node sends the message to the node may include an act that the ingress node sends the message to the node by sending an extended IGP message to the node.

In an embodiment, after the ingress node sends the message to the node, the method may further include the following acts. The ingress node receives the revocation message which is sent through a southbound interface protocol by the controller. The revocation message is used for indicating the node to delete the mapping relationship between the segment list and the segment list ID, and/or is used for indicating the node to delete the label forwarding table. After receiving the revocation message, the ingress node sends an extended IGP message to the node to indicate the node to delete the mapping relationship between the segment list and the segment list ID, and/or indicate the node to delete the label forwarding table.

In an embodiment, the southbound interface protocol may include: BGP-LS, PCEP, OPENFLOW, or Netconf.

In an embodiment, the act that the ingress node sends the received revocation message to the node may include an act that the ingress node sends the message to the node by sending an extended IGP message to the node.

According to another embodiment of the disclosure, a device for constructing a label and forwarding a label packet is provided, which is applied to the node, and includes a first receiving module and a constructing module. The first receiving module is configured to receive a message which carries a segment list and a segment list ID for identifying the segment list. The constructing module is configured to construct a label forwarding table according to the segment list and the segment list ID, and perform forwarding according to the label forwarding table; and/or, the constructing module is configured to maintain a mapping relationship between the segment list and the segment list ID.

In an embodiment, the device may further include a second receiving module. The second receiving module is configured to receive a revocation message sent by a controller or an ingress node. The revocation message is used for indicating the node to delete the mapping relationship between the segment list and the segment list ID, and/or is used for indicating the node to delete the label forwarding table.

According to another embodiment of the disclosure, a device for constructing a label and forwarding a label packet is also provided, which is applied to the controller, and includes a first sending module. The first sending module is configured to send a message to a node. The message carries a segment list and a segment list ID for identifying the segment list. The segment list and the segment list ID are used for indicating the node to construct a label forwarding table and perform forwarding according to the label forwarding table; and/or, the segment list and the segment list ID are used for indicating the node to maintain a mapping relationship between the segment list and the segment list ID.

In an embodiment, the device may further include a second sending module. The second sending module is configured to send a revocation message to the node through a southbound interface protocol. The revocation message is used for indicating the node to delete the mapping relationship between the segment list and the segment list ID, and/or is used for indicating the node to delete the label forwarding table.

In an embodiment, the southbound interface protocol may include: BGP-LS, PCEP, OPENFLOW or Netconf.

According to another embodiment of the disclosure, a device for constructing a label and forwarding a label packet is also provided, which is applied to the ingress node, and includes a third receiving module and a third sending module. The third receiving module is configured to receive a message sent by a controller. The message carries a segment list and a segment list ID for identifying the segment list. The third sending module is configured to send the message to the node. The message is used for indicating the node to construct a label forwarding table and perform forwarding according to the label forwarding table; and/or, the message is used for indicating the node to maintain a mapping relationship between the segment list and the segment list ID.

In an embodiment, the device may further include a fourth receiving module and a fourth sending module. The fourth receiving module is configured to receive a revocation message sent by the controller through a southbound interface protocol. The revocation message is used for indicating the node to delete the mapping relationship between the segment list and the segment list ID, and/or is used for indicating the node to delete the label forwarding table. The fourth sending module is configured to, after the revocation message is received, send an extended IGP message to the node to indicate the node to delete the mapping relationship between the segment list and the segment list ID, and/or indicate the node to delete the label forwarding table.

In an embodiment, the southbound interface protocol may include: BGP-LS, PCEP, OPENFLOW or Netconf.

According to the solution, a node receives a message which carries a segment list and a segment list ID for identifying the segment list. The node constructs a label forwarding table according to the segment list and the segment list ID, and performs forwarding according to the label forwarding table; and/or the node maintains a mapping relationship between the segment list and the segment list ID. In such a manner, the solution may solve the problem of needing to upgrade forwarding plane hardware to support a greater label stack processing capacity, and the problem of load efficiency and the MTU problem, thereby achieving effects of lowering the requirement for the label stack processing capacity of the forwarding plane hardware, and effectively solving the problem of load efficiency and the MTU problem.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form a limit to the disclosure. In the accompanying drawings:

FIG. 10 is an architecture diagram of explicit routing in an SR network according to a first embodiment of the disclosure;

FIG. 11 is a flowchart of the explicit routing in the SR network according to a first embodiment of the disclosure;

FIG. 12 is a label forwarding table constructed on a node R1 according to a first embodiment of the disclosure;

FIG. 13 is a label forwarding table constructed on a node R2 according to a first embodiment of the disclosure;

FIG. 14 is a label forwarding table constructed on a node R3 according to a first embodiment of the disclosure;

FIG. 15 is a schematic diagram of the format of a data packet carrying an SR packet header which is issued to an ingress node RO by a controller according to a first embodiment of the disclosure;

FIG. 16 is a schematic diagram of the format of a data packet carrying an SR packet header which is forwarded to the next node by a node A1 according to a first embodiment of the disclosure;

FIG. 17 is a schematic diagram of the format of a data packet carrying an SR packet header which is forwarded to the next node by a node R1 according to a first embodiment of the disclosure;

FIG. 18 is a schematic diagram of the format of a data packet carrying an SR packet header which is forwarded to the next node by a node A2 according to a first embodiment of the disclosure;

DETAILED DESCRIPTION OF THE EMBODIMENTS

The disclosure is elaborated below with reference to the accompanying drawings and embodiments. Note that, the embodiments of the disclosure and the characteristics in the embodiments may be combined under the condition of no conflicts.

Figure 1:
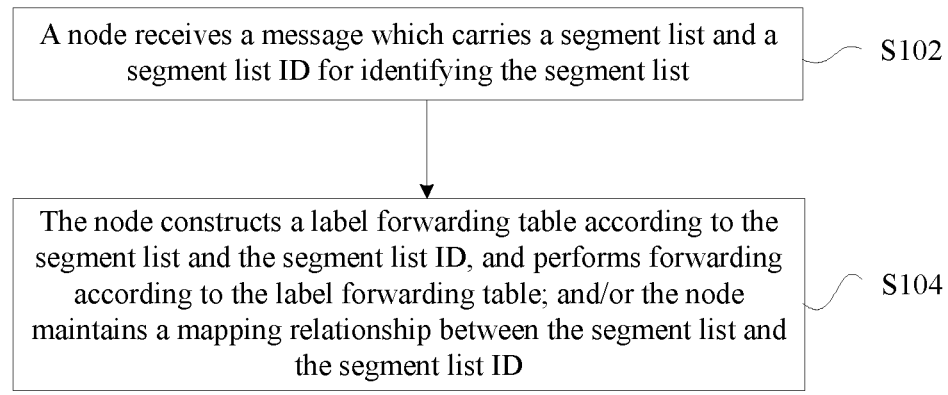
FIG. 1 is a flowchart of a first method for constructing a label and forwarding a label packet according to an embodiment of the disclosure.

In the present embodiment, a method for constructing a label and forwarding a label packet is provided. FIG. 1 is a flowchart of a first method for constructing a label and forwarding a label packet according to an embodiment of the disclosure. As shown in FIG. 1, the flow includes the following acts.

At act S102, a node receives a message which carries a segment list and a segment list ID for identifying the segment list.

At act S104, the node constructs a label forwarding table according to the segment list and the segment list ID, and performs forwarding according to the label forwarding table; and/or the node maintains a mapping relationship between the segment list and the segment list ID.

According to the above acts, by constructing the label forwarding table according to the segment list and the segment list ID, the depth of the label constructed by the node may be effectively reduced, thereby lowering the requirement for a label stack processing capacity of forwarding plane hardware. In such a manner, the problem of needing to upgrade forwarding plane hardware to support a greater label stack processing capacity, and the problem of load efficiency and the MTU problem are solved, thereby achieving effects of lowering the requirement for the label stack processing capacity of the forwarding plane hardware, and effectively solving the problem of load efficiency and the MTU problem.

The message may be sent by an ingress node after the ingress node receives the segment list and the segment list ID sent by a controller, or the message may be sent by the controller directly. In an exemplary embodiment, the node may receive the message from the controller; and/or, the node may receive the message from the ingress node, and the message is sent by the ingress node after the ingress node receives the segment list and the segment list ID sent by the controller, that is, the ingress node first receives the segment list and the segment list ID sent by the controller, and then sends the received segment list and segment list ID to the node.

When receiving the message sent by the controller, the node may receive the message which is sent by the controller through a southbound interface protocol; and/or, when receiving the message from the ingress node, the node may receive the message which is sent by the ingress node through an extended IGP message.

The southbound interface protocol may include: BGP-LS, PCEP, OPENFLOW, or Netconf.

In an exemplary embodiment, after receiving the message, the node may also receive a revocation message sent by a controller or an ingress node. The revocation message is used for indicating the node to delete the mapping relationship between the segment list and the segment list ID, and/or is used for indicating the node to delete the label forwarding table.

When the node constructs the label forwarding table according to the segment list and the segment list ID, there may be many constructing ways. In an exemplary embodiment, when the node is a last node in the segment list and a previous node of the node does not carry an inner label in a forwarding packet, the node does not construct a label table item in the label forwarding table. In this embodiment, the inner label is constructed according to an SRGB of a next node of the node and the segment list ID.

There may be many types of segment list IDs. In an exemplary embodiment, the segment list ID may be a label or an index, and the global label may be an index offset when SRGBs of all nodes in an SR domain are the same.

When the segment list ID is an index, the label forwarding label may be constructed in the following way. In an exemplary embodiment, when the node is not a last node, the node may construct an ingress label according to an SRGB of the node and the segment list ID, and construct an egress label stack; and the egress label stack may include at least one of the followings: an inner label, or one or more outer labels. The inner label is constructed according to an SRGB of a next node of the node and the segment list ID. The one or more outer labels may include at least one of the followings: a label corresponding to a node ID to which each remaining node corresponds, or a label corresponding to a node ID to which a next node of the node corresponds.

When an indicator bit indicates that an egress label is needed to be encapsulated according to a specific RLD, the node constructs the egress label stack including one or more outer labels according to the specific RLD.

When the segment list ID is an index, the label forwarding label may also be constructed in the following way. In another exemplary embodiment, when the node is the ingress node, and the indicator bit indicates that it is needed to encapsulate the egress label according to the specific RLD, an ingress node constructs an egress label stack; and the egress label stack includes at least one of the followings: an inner label, or one or more outer labels. The inner label is constructed according to the segment list ID and an SRGB of a farthest node in the segment list which is able to be encapsulated in a scope limited by the specific RLD. The one or more outer labels are as follows from outside to inside: a label corresponding to a first node in the segment list, which is determined according to a direct connect nexthop indicated by a shortest path from the ingress node to a first node in the segment list; labels corresponding to nodes from a second node to an mth node in the segment list, each of which is determined according to a previous node of this node in the segment list, herein the mth node is determined according to the farthest node in the segment list which is able to be encapsulated in the scope limited by the specific RLD.

When the farthest node in the segment list which is able to be encapsulated in the scope limited by the specific RLD is a last node in the segment list, the egress label stack may not include the inner label.

In an exemplary embodiment, when the segment list ID is an index and the node is the ingress node, the label forwarding label may also be constructed in the following way. When an indicator bit indicates that an egress label is not needed to be encapsulated according to a specific RLD, an ingress node constructs an egress label stack; and the egress label stack includes at least one of the followings: an inner label or an outer label. The inner label is constructed according to an SRGB of a first node except the ingress node in the segment list and the segment list ID, and the outer label is determined according to a direct connect nexthop indicated by a shortest path from the ingress node to a first node except the ingress node in the segment list.

When the first node except the ingress node in the segment list is also a last node in the segment list, the egress label stack may not include the inner label.

In an exemplary embodiment, when the segment list ID is an index, and the node is a node except the ingress node in the segment list, if an indicator bit indicates that an egress label is not needed to be encapsulated according to a specific RLD, an egress label stack constructed by the node includes at least one of the followings: an inner label or one outer label. The inner label is constructed according to an SRGB of a next node of the node and the segment list ID, and the outer label is constructed according to an SRGB of a direct connect nexthop indicated by a shortest path from the node to a next node of the node and an ID of the next node.

In an exemplary embodiment, when the segment list ID is an index, and the node is a node except the ingress node in the segment list, if an indicator bit indicates that an egress label is needed to be encapsulated according to a specific RLD, a node i constructs an egress label stack; and the egress label stack includes at least one of the followings: an inner label, or one or more outer labels. The inner label is constructed according to the segment list ID and an SRGB of a farthest node m in the segment list which is able to be encapsulated in a scope limited by the specific RLD. The one or more outer labels are as follows from outside to inside: a label corresponding to a next node i+1 of the node i, which is determined according to a direct connect nexthop indicated by a shortest path from the node i to the next node i+1 of the node i; and labels corresponding to nodes from a node i+2 to a node m in the segment list, each of which is determined according to a previous node of this node in the segment list. Herein, the node i is a node except the ingress node in the segment list, and the node m is determined according to the farthest node in the segment list which is able to be encapsulated in the scope limited by the specific RLD.

When the farthest node in the segment list which is able to be encapsulated in the scope limited by the specific RLD is a last node in the segment list, the egress label stack may not include the inner label.

The specific RLD may be greater than or equal to 2, and when the node encapsulates a label stack of a packet, a depth of the label stack is not greater than the specific RLD. The stack depth is configurable. In an exemplary embodiment, the specific RLD may be configured explicitly, or may be a network-wide minimum value obtained by learning.

Nodes between the node and a next node of the node may include different types of nodes. In an exemplary embodiment, the nodes between the node and a next node of the node may include at least one of the followings: an SR node and/or a non-SR node; and/or, tunnels between the node and a next node of the node include at least one of the followings: an LDP LSP, an RSVP-TE LSP, a BGP LSP, or an SR LSP.

When the segment list includes only one node, the segment list ID may be a node ID of the node.

Figure 2:
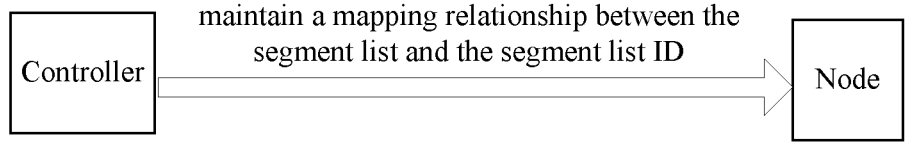
FIG. 2 is a flowchart of a second method for constructing a label and forwarding a label packet according to an embodiment of the disclosure.

FIG. 2 is a flowchart of a second method for constructing a label and forwarding a label packet according to an embodiment of the disclosure. As shown in FIG. 2, the method includes the following act.

At act S202, a controller sends a message to a node. The message carries a segment list and a segment list ID for identifying the segment list. The segment list and the segment list ID are used for indicating the node to construct a label forwarding table and perform forwarding according to the label forwarding table; and/or, the segment list and the segment list ID are used for indicating the node to maintain a mapping relationship between the segment list and the segment list ID.

According to the above act, the controller sends the segment list and the segment list ID for constructing the label forwarding table to the node, and the node constructs the label forwarding table according to the segment list and the segment list ID, so that the depth of the label constructed by the node may be effectively reduced, thereby lowering the requirement for a label stack processing capacity of forwarding plane hardware. In such a manner, the problem of needing to upgrade forwarding plane hardware to support a greater label stack processing capacity, and the problem of load efficiency and the MTU problem are solved, thereby achieving effects of lowering the requirement for the label stack processing capacity of the forwarding plane hardware, and effectively solving the problem of load efficiency and the MTU problem.

When the controller sends the message to the node, there may be many sending ways. In an exemplary embodiment, the controller may send the message to the node through a southbound interface protocol.

The type of the southbound interface protocol is not limited. In an exemplary embodiment, the southbound interface protocol may include: BGP-LS, PCEP, OPENFLOW, or Netconf.

After sending the message to the node, the controller may also send a revocation message to the node. In an exemplary embodiment, the controller sends the revocation message to the node through a southbound interface protocol. The revocation message is used for indicating the node to delete the mapping relationship between the segment list and the segment list ID, and/or is used for indicating the node to delete the label forwarding table.

Figure 3:
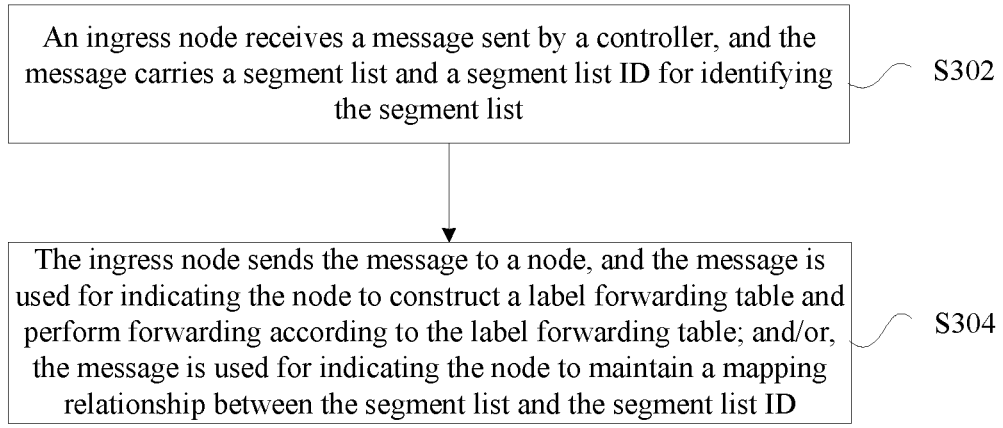
FIG. 3 is a flowchart of a third method for constructing a label and forwarding a label packet according to an embodiment of the disclosure.

FIG. 3 is a flowchart of a third method for constructing a label and forwarding a label packet according to an embodiment of the disclosure. As shown in FIG. 3, the method includes the following acts.

At act S302, an ingress node receives a message sent by a controller. The message carries a segment list and a segment list ID for identifying the segment list.

At act S304, the ingress node sends the message to the node. The message is used for indicating the node to construct a label forwarding table and perform forwarding according to the label forwarding table; and/or, the message is used for indicating the node to maintain a mapping relationship between the segment list and the segment list ID.

According to the above acts, the ingress node sends the segment list and the segment list ID for constructing the label forwarding table to the node, and the node constructs the label forwarding table according to the segment list and the segment list ID, so that the depth of the label constructed by the node may be effectively reduced, thereby lowering the requirement for a label stack processing capacity of forwarding plane hardware. In such a manner, the problem of needing to upgrade forwarding plane hardware to support a greater label stack processing capacity, and the problem of load efficiency and the MTU problem are solved, thereby achieving effects of lowering the requirement for the label stack processing capacity of the forwarding plane hardware, and effectively solving the problem of load efficiency and the MTU problem.

When the ingress node sends the message to the node, there may be many sending ways. In an exemplary embodiment, the ingress node may send the message to the node by sending an extended IGP message to the node, and in this embodiment, the extended IGP message is the above message.

After sending the message to the node, the ingress node may also send the revocation message to the node. In an exemplary embodiment, the ingress node receives the revocation message which is sent through a southbound interface protocol by the controller. The revocation message is used for indicating the node to delete the mapping relationship between the segment list and the segment list ID, and/or is used for indicating the node to delete the label forwarding table. After receiving the revocation message, the ingress node may send an extended IGP message to the node to indicate the node to delete the mapping relationship between the segment list and the segment list ID, and/or indicate the node to delete the label forwarding table.

The type of the southbound interface protocol is not limited. In an exemplary embodiment, the southbound interface protocol may include: BGP-LS, PCEP, OPENFLOW, or Netconf.

When sending the received revocation message to the node, the ingress node may send the revocation message to the node by sending an extended IGP message to the node, and in this embodiment, the extended IGP message is the revocation message.

A device for constructing a label and forwarding a label packet is provided in another embodiment. The device is configured to implement the above embodiments and exemplary implementations, which will not be elaborated herein. The term "module" used below may realize a combination of software and/or hardware with an intended function. Although the device described in the following embodiment is realized through software better, the realization through hardware or a combination of software and hardware is possible and conceived.

Figure 4:
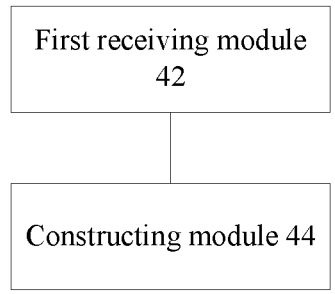
FIG. 4 is a structure diagram of a first device for constructing a label and forwarding a label packet according to an embodiment of the disclosure.

FIG. 4 is a structure diagram of a first device for constructing a label and forwarding a label packet according to an embodiment of the disclosure. The device is applied to a node. As shown in FIG. 4, the device includes a first receiving module 42 and a constructing module 44; the device is elaborated below.

The first receiving module 42 is configured to receive a message which carries a segment list and a segment list ID for identifying the segment list. The constructing module 44 is coupled to the first receiving module 42, and is configured to construct a label forwarding table according to the segment list and the segment list ID, and perform forwarding according to the label forwarding table; and/or, the constructing module is configured to maintain a mapping relationship between the segment list and the segment list ID.

The message received by the first receiving module 42 may be sent by an ingress node after the ingress node receives the segment list and the segment list ID sent by a controller, or may be sent by the controller directly. In an exemplary embodiment, the node may receive the message from the controller; and/or, the node may receive the message from the ingress node, and the message is sent by the ingress node after the ingress node receives the segment list and the segment list ID sent by the controller, that is, the ingress node first receives the segment list and the segment list ID sent by the controller, and then sends the received segment list and segment list ID to the node.

When receiving the message sent by the controller, the first receiving module 42 may receive the message which is sent by the controller through the southbound interface protocol; and/or, when receiving the message from the ingress node, the first receiving module 42 may receive the message which is sent by the ingress node through the extended IGP message.

The southbound interface protocol may include: BGP-LS, PCEP, OPENFLOW, or Netconf.

Figure 5:
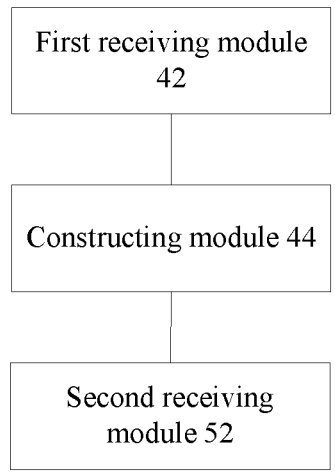
FIG. 5 is a first exemplary structure diagram of the first device for constructing a label and forwarding a label packet according to an embodiment of the disclosure.

FIG. 5 is a first exemplary structure diagram of the first device for constructing a label and forwarding a label packet according to an embodiment of the disclosure. As shown in FIG. 5, in addition to all the modules shown in FIG. 4, the device may further include a second receiving module 52. The device is elaborated below.

The second receiving module 52 is coupled to the constructing module 44, and is configured to receive a revocation message sent by a controller or an ingress node. The revocation message is used for indicating the node to delete the mapping relationship between the segment list and the segment list ID, and/or is used for indicating the node to delete the label forwarding table.

When the constructing module 44 constructs the label forwarding table, there may be many constructing ways. In an exemplary embodiment, when the node is a last node in the segment list and a previous node of the node does not carry the inner label in the forwarding packet, the node does not construct the label table item in the label forwarding table. In this embodiment, the inner label is constructed according to an SRGB of a next node of the node and the segment list ID.

There may be many types of segment list IDs. In an exemplary embodiment, the segment list ID may be the label or the index, and the global label may be the index offset when the SRGBs of all the nodes in the SR domain are the same.

When the segment list ID is an index, the constructing module 44 may also construct the label forwarding table in the following way. In an exemplary embodiment, when the node is not a last node, the node may construct the ingress label according to an SRGB of the node and the segment list ID, and construct a egress label stack which may include at least one of the followings: an inner label, or one or more outer labels. The inner label is constructed according to an SRGB of a next node of the node and the segment list ID. The one or more outer labels may include at least one of the followings: the label corresponding to the node ID to which the remaining node corresponds, and the label corresponding to the node ID to which the next node of the node corresponds.

When an indicator bit indicates that an egress label is needed to be encapsulated according to a specific RLD, the node constructs the egress label stack including one or more outer labels according to the specific RLD.

When the segment list ID is an index, the constructing module 44 may also construct the label forwarding table in the following way. In another exemplary embodiment, when the node is the ingress node, and the indicator bit indicates that it is needed to encapsulate the egress label according to the specific RLD, an ingress node constructs an egress label stack; and the egress label stack includes at least one of the followings: an inner label, or one or more outer labels. The inner label is constructed according to the segment list ID and an SRGB of a farthest node in the segment list which is able to be encapsulated in a scope limited by the specific RLD. The one or more outer labels are as follows from outside to inside: a label corresponding to a first node in the segment list, which is determined according to a direct connect nexthop indicated by a shortest path from the ingress node to a first node in the segment list; labels corresponding to nodes from a second node to an mth node in the segment list, each of which is determined according to a previous node of this node in the segment list. Herein, the mth node may be determined according to the farthest node in the segment list which is able to be encapsulated in the scope limited by the specific RLD.

When the farthest node in the segment list which is able to be encapsulated in the scope limited by the specific RLD is a last node in the segment list, the egress label stack may not include the inner label.

In an exemplary embodiment, when the segment list ID is an index and the node is the ingress node, the constructing module 44 may also construct the label forwarding table in the following way. When an indicator bit indicates that an egress label is not needed to be encapsulated according to a specific RLD, an ingress node constructs an egress label stack; and the egress label stack includes at least one of the followings: an inner label or an outer label. The inner label is constructed according to an SRGB of a first node except the ingress node in the segment list and the segment list ID, and the outer label is determined according to a direct connect nexthop indicated by a shortest path from the ingress node to a first node except the ingress node in the segment list.

When the first node except the ingress node in the segment list is also a last node in the segment list, the egress label stack may not include the inner label.

In an exemplary embodiment, when the segment list ID is an index, and the node is a node except the ingress node in the segment list, if an indicator bit indicates that an egress label is not needed to be encapsulated according to a specific RLD, an egress label stack constructed by the node includes at least one of the followings: an inner label or one outer label. The inner label is constructed according to an SRGB of a next node of the node and the segment list ID, and the outer label is constructed according to an SRGB of a direct connect nexthop indicated by a shortest path from the node to a next node of the node and an ID of the next node.

In an exemplary embodiment, when the segment list ID is an index, and the node is a node except the ingress node in the segment list, if an indicator bit indicates that an egress label is needed to be encapsulated according to a specific RLD, a node i constructs an egress label stack which may include at least one of the followings: an inner label, or one or more outer labels. The inner label is constructed according to the segment list ID and an SRGB of a farthest node m in the segment list which is able to be encapsulated in a scope limited by the specific RLD. The one or more outer labels are as follows from outside to inside: a label corresponding to a next node i+1 of the node i, which is determined according to a direct connect nexthop indicated by a shortest path from the node i to the next node i+1 of the node i; and labels corresponding to nodes from a node i+2 to a node m in the segment list, each of which is determined according to a previous node of this node in the segment list. Herein, the node i is a node except the ingress node in the segment list, and the node m is determined according to the farthest node in the segment list which is able to be encapsulated in the scope limited by the specific RLD.

When the farthest node in the segment list which is able to be encapsulated in the scope limited by the specific RLD is a last node in the segment list, the egress label stack may not include the inner label.

The specific RLD may be greater than or equal to 2, and when the node encapsulates a label stack of a packet, a depth of the label stack is not greater than the specific RLD. The stack depth is configurable. In an exemplary embodiment, the specific RLD may be configured explicitly, or is a network-wide minimum value obtained by learning.

The nodes between the node and a next node of the node may include different types of nodes. In an exemplary embodiment, the nodes between the node and a next node of the node may include at least one of the followings: an SR node and/or a non-SR node; and/or, the tunnels between the node and a next node of the node include at least one of the followings: an LDP LSP, an RSVP-TE LSP, a BGP LSP, or an SR LSP.

When the segment list includes only one node, the segment list ID may be a node ID of the node.

Figure 6:
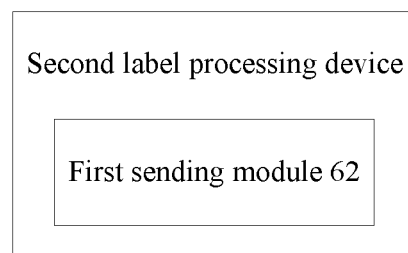
FIG. 6 is a structure diagram of a second device for constructing a label and forwarding a label packet according to an embodiment of the disclosure.

FIG. 6 is a structure diagram of a second device for constructing a label and forwarding a label packet according to an embodiment of the disclosure. The device may be applied to a controller. As shown in FIG. 6, the device includes a first sending module 62. The device is elaborated below.

The first sending module 62 is configured to send a message to a node. The message carries a segment list and a segment list ID for identifying the segment list. The segment list and the segment list ID are used for indicating the node to construct a label forwarding table and perform forwarding according to the label forwarding table; and/or, the segment list and the segment list ID are used for indicating the node to maintain a mapping relationship between the segment list and the segment list ID.

When the first sending module 62 sends the message to the node, there may be many sending ways. In an exemplary embodiment, the first sending module 62 may send the message to the node through a southbound interface protocol.

The type of the southbound interface protocol is not limited. In an exemplary embodiment, the southbound interface protocol may include: BGP-LS, PCEP, OPENFLOW, or Netconf.

Figure 7:
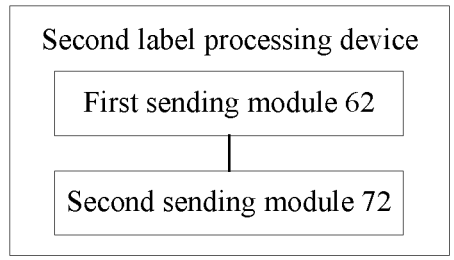
FIG. 7 is a first exemplary structure diagram of the second device for constructing a label and forwarding a label packet according to an embodiment of the disclosure.

FIG. 7 is a first exemplary structure diagram of the second device for constructing a label and forwarding a label packet according to an embodiment of the disclosure. As shown in FIG. 7, in addition to all the modules shown in FIG. 6, the device may further include a second sending module 72. The device is elaborated below.

The second sending module 72 is coupled to the first sending module 62, and is configured to send a revocation message to the node through a southbound interface protocol. The revocation message is used for indicating the node to delete the mapping relationship between the segment list and the segment list ID, and/or is used for indicating the node to delete the label forwarding table.

The southbound interface protocol may include: BGP-LS, PCEP, OPENFLOW, or Netconf.

Figure 8:
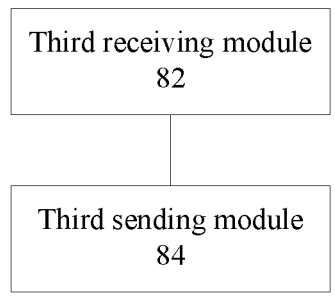
FIG. 8 is a structure diagram of a third device for constructing a label and forwarding a label packet according to an embodiment of the disclosure.

FIG. 8 is a structure diagram of a third device for constructing a label and forwarding a label packet according to an embodiment of the disclosure. The device may be applied to an ingress node. As shown in FIG. 8, the device includes a third receiving module 82 and a third sending module 84. The device is elaborated below.

The third receiving module 82 is configured to receive a message sent by a controller. The message carries a segment list and a segment list ID for identifying the segment list. The third sending module 84 is coupled to the third receiving module 82, and is configured to send the message to the node. The message is used for indicating the node included in the segment list to construct a label forwarding table and perform forwarding according to the label forwarding table; and/or, the message is used for indicating the node to maintain a mapping relationship between the segment list and the segment list ID.

When the third sending module 84 sends the message to the node, there may be many sending ways. In an exemplary embodiment, the third sending module 84 may send the message to the node by sending an extended IGP message to the node, and in this embodiment, the extended IGP message is the above message.

Figure 9:
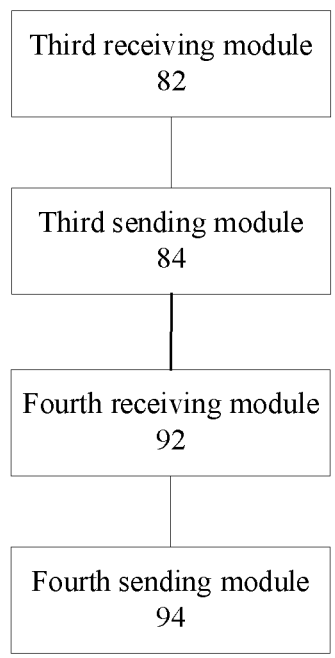
FIG. 9 is a first exemplary structure diagram of the third device for constructing a label and forwarding a label packet according to an embodiment of the disclosure.

FIG. 9 is a first exemplary structure diagram of the third device for constructing a label and forwarding a label packet according to an embodiment of the disclosure. As shown in FIG. 9, in addition to all the modules shown in FIG. 8, the device may further include a fourth receiving module 92 and a fourth sending module 94. The device is elaborated below.

The fourth receiving module 92 is coupled to the third sending module 84, and is configured to receive the revocation message which is sent through a southbound interface protocol by the controller. The revocation message is used for indicating the node to delete the mapping relationship between the segment list and the segment list ID, and/or is used for indicating the node to delete the label forwarding table. The fourth sending module 94 is coupled to the fourth receiving module 92, and is configured to, after the revocation message is received, send an extended IGP message to the node to indicate the node to delete the mapping relationship between the segment list and the segment list ID, and/or indicate the node to delete the label forwarding table.

The southbound interface protocol may include: BGP-LS, PCEP, OPENFLOW, or Netconf.

For solving the problem of needing to upgrade forwarding plane hardware to support a greater label stack processing capacity, and the problem of load efficiency and the MTU problem, an embodiment of the disclosure provides an explicit routing method in the SR network. The method enables the network to have the capability of source specified routing of segment routing without upgrading a forwarding plane chip in the existing network by converting the segment list into label stack leveling. The method is realized by the following solution.

A segment list ID is allocated to uniquely identify the segment list. The segment list may be an IP address list, or a global label list, or an index list, or a combination of them, namely a list composed of information that may identity a segment node.

The segment list and the segment ID may be allocated by the controller in a unified way. Alternatively, the segment list may be directly configured by the ingress node, the ingress node sends the configured segment list to the controller, and the controller allocates the segment ID. The segment ID may be called SL-SID for short in the following embodiments.

The SL-SID may be a label or an index. In the present embodiment, the description is given by taking that the SL-SID is the index for example. It may be noted that the label may be computed according to SRGB[index].

The controller may notify the SL-SID to the corresponding segment node in the segment list through the southbound interface protocol. The controller may notify the SL-SID to the ingress node through e.g., BGP-LS or PCEP, and the ingress node performs flooding in the SR domain through the extended IGP.

When computing the label stack for the packet that starts from the ingress node and is directed by the segment list, the controller or the ingress node may encapsulate, based on a global specific RLD strategy, the label stack according to or not according to the specific RLD. The specific RLD is a specific readable label depth, and may be configured explicitly or may be a network-wide minimum value learned through the protocol. The final specific RLD is suggested to be forcibly greater than or equal to 2, so as to at least support a VPN label plus an SR label.

On the last segment node (denoted by Node_n) in the segment list, the label table item is as follows:
  ingress label: SRGB_Node_n[SL-SID];
  label operation: POP;
  FLAG: label end.

In an exemplary embodiment, it is feasible to not construct the label table item on the last segment node (denoted by Node_n), provided that the label table item of the penultimate SR NODE is also realized by adopting the following optimization, and the label SRGB_Node_n[SL-SID] is not carried in the forwarding packet.

On a non-last segment node (denoted by Node_i), the label table item is as follows:

ingress label: SRGB_Node_i[SL-SID];
label operation: SWAP;
FLAG: whether it is needed to encapsulate the egress label according to the specific RLD;
specific RLD: may be configured explicitly, or may be a network-wide minimum RLD learned through the protocol; but the specific RLD is suggested to be forcibly greater than or equal to 2.

For the egress label stack,
outer layer: multiple labels corresponding to NODE-SIDs to which the remaining SR NODEs (namely Node_i+1, . . . Node_n) correspond;
inner layer: the label corresponding to the SL-SID;
nexthop/port: the shortest path (including ECMP/FRR) to Node_i+1.

Herein, the nexthop/port is the direct connect nexthop and egress port indicated by the shortest path from Node_i to Node_i+1. The nodes between Node_i and Node_i+1, including the nexthop node, may be the SR node or the non-SR node. That is, the tunnels from Node_i to Node_i+1 may be LSP, for example, an LDP LSP, or an RSVP-TE LSP, or a BGP LSP, or an SR LSP. The description is given by taking that the tunnel is the SR LSP for example.

The egress label stack of the label table item corresponding to the SL-SID on Node_i is composed of the labels corresponding to multiple outer NODE-SIDs and the labels corresponding to the inner SL-SID. The sequence of the multiple outer labels from outside to inside is as follows:

SRGB_nexthop[Node_i+1–SID]
SRGB_Node_i+1 [Node_i+2–SID]
SRGB_Node_i+2 [Node_i+3–SID] ......
SRGB_Node_n–1 [Node_n–SID].

The FLAG of the label table item corresponding to the SL-SID on the Node_i indicates whether it is needed to encapsulate the egress label stack according to the specific RLD. If it is needed to encapsulate the egress label stack according to the specific RLD, it means that the labels may be encapsulated as many as possible as long as the label stack depth when the packet forwarding leaves Node_i does not exceed the specific RLD. Under such a circumstance, the label stack may include a private network service label, the labels corresponding to multiple outer NODE-SIDs, and the label corresponding to the inner SL-SID. Thus, the generated label table item may need to include the labels corresponding to multiple outer NODE-SIDs (namely Node_i+1, . . . Node_n) and the label corresponding to the inner SL-SID. If it is not needed to encapsulate the egress label stack according to the specific RLD, the labels may be encapsulated as less as possible. Under such a circumstance, the label stack may include the private network service label, the label corresponding to the next NODE-SID, and the label corresponding to the inner SL-SID. Thus, the generated label table item only needs to include the label corresponding to one outer NODE-SID (namely Node_i+1) and the label corresponding to the inner SL-SID.

The FLAG may be specified according to a policy.

When it is not needed to encapsulate the egress label stack according to the specific RLD, the label corresponding to the inner SL-SID in the label stack of the packet may be determined according to the next SR node (Node_i+1), that is, the label corresponding to the inner SL-SID in the label stack is SRGB_Node_i+1[SL-SID]. The entire label stack of the packet from outside to inside is as follows:

SRGB_nexthop[Node_i+1–SID]
SRGB_Node_i+1 [SL–SID]
VPN service Labels.

If Node_i+1 is exactly Node_n, in an exemplary embodiment, the egress label stack of the label table item may not need to include SRGB_Node_i+1 [SL-SID], since the packet may be delivered to Node_n by means of SRGB_nexthop[Node_i+1-SID].

When it is needed to encapsulate the egress label stack according to the specific RLD, the label corresponding to the inner SL-SID in the label stack of the packet may be determined according to the farthest Node_m which is able to be encapsulated in the scope limited by the specific RLD, that is, the label corresponding to the inner SL-SID in the label stack is SRGB_Node_m[SL-SID]. The entire label stack of the packet from outside to inside is as follows:

SRGB_nexthop[Node_i+1–SID]
SRGB_Node_i+1 [Node_i+2–SID]
SRGB_Node_i+2[Node_i+3–SID] ......
SRGB_Node_m–1 [Node_m–SID]
SRGB_Node_m [SL–SID]
VPN service Labels.

The number of the labels is not allowed to exceed the specific RLD. In an exemplary embodiment, when the Node_m is exactly Node_n, the egress label stack of the label table item may not need to include SRGB_Node_m [SL-SID], since the packet may be delivered to Node_n by means of SRGB_Node_m–1 [Node_m-SID]. When it is not needed to encapsulate the egress label stack according to the specific RLD, the label corresponding to the inner SL-SID in the label stack of the packet of the ingress node is determined according to the first SR node (Node_1), that is, the label corresponding to the inner SL-SID in the label stack is SRGB_Node_1[SL-SID]. The label corresponding to the outer Node_1 is determined according to a direct connect nexthop indicated by the shortest path from the ingress node to Node_1, that is, the label corresponding to the outer Node_1 in the label stack is SRGB_nexthop[Node_1-SID]. The entire label stack of the packet of the ingress node from outside to inside is as follows:

SRGB_nexthop[Node_1–SID]
SRGB_Node_1 [SL–SID]
VPN service Labels.

If the ingress node is not the first node in the SR list, then node1 is the first node in the SR list; if the ingress node is the first node in the SR list, then node1 is the second node in the SR list.

If Node_1 is exactly Node_n (namely the last node in the SR list), as an optimization, the label stack of the packet may not need to include SRGB_Node_1 [SL-SID], since the packet may be delivered to Node_n by means of SRGB_nexthop[Node_1-SID].

When it is needed to encapsulate the egress label stack according to the specific RLD, the label corresponding to the inner SL-SID in the label stack of the packet is determined according to the farthest Node_m which is able to be encapsulated in the scope limited by the specific RLD, that is, the label corresponding to the inner SL-SID in the label stack is SRGB_Node_m[SL-SID]. The label corresponding to the outer Node_1 is determined according to a direct connect nexthop indicated by the shortest path from the ingress node to Node_1, that is, the label corresponding to the outer Node_1 in the label stack is SRGB_nexthop [Node_1-SID]. The label corresponding to the outer Node_2 in the label stack is SRGB_Node_1[Node_2-SID]. The label corresponding to the outer Node_3 is determined according to Node_2, that is, the label corresponding to the outer Node_3 in the label stack is SRGB_Node_2[Node_3-SID], and so on. The entire label stack of the packet from outside to inside is as follows:

SRGB_nexthop[Node_1-SID]
SRGB_Node_1 [Node_2-SID]
SRGB_Node_2 [Node_3-SID] ......
SRGB_Node_m-1 [Node_m-SID]
SRGB_Node_m [SL-SID]
VPN service Labels.

The number of the labels is not allowed to exceed the specific RLD.

If Node_m is exactly Node_n (namely the last node in the SR list), as an optimization, the label stack of the packet may not need to include SRGB_Node_m [SL-SID], since the packet may be delivered to Node_n by means of SRGB_Node_m-1 [Node_m-SID].

If the segment list includes only one segment node, then the SL-SID allocated for the segment list may be node-SID allocated for the segment node.

After receiving the segment list and the SL-SID, the corresponding segment node in the segment list generates the label table item corresponding to the SL-SID.

The disclosure is elaborated below in combination with the specific embodiments.

First Embodiment

FIG. 10 is an architecture diagram of explicit routing in an SR network according to a first embodiment of the disclosure. As shown in FIG. 10, the nexthop indicated by the shortest path from the R0 to the R1 is the node A1, the nexthop indicated by the shortest path from the R1 to the R2 is the node A2, and the nexthop indicated by the shortest path from the R2 to the R3 is the node A3; the end-to-end tunnel from the R0 to the R3 is specified to pass the nodes R1, R2 and R3; the R0 is the ingress node, and a traffic-bound segment list on the R0 may be configured by the R0 or issued by a concentrated controller. The traffic-bound segment list may be <R1, R2, R3>, which is a list capable of identifying node information, such as an IP address list, a global label list, and an index list. The traffic-bound segment list may also be an egress label stack <Label 1, Label 2> which is able to be directly applied to the packet header. The segment list <R1, R2, R3> may be denoted by SL1, and the controller also allocates a segment ID for the SL1. If the segment ID is 300, the SID allocated for the segment list may be called SL-SID for short. The SL-SID may be either the label or the index. In the present embodiment, an elaboration is given by taking that the SL-SID is the index. The label may be computed according to SRGB [index]. FIG. 11 is a flowchart of the explicit routing in the SR network according to a first embodiment of the disclosure. As shown in FIG. 11, the flow includes the following acts.

At act S1102, the controller notifies a segment list <R1, R2, R3> and an SL-SID300 to each node included in the segment list through the southbound interface protocol.

The southbound interface protocol may be BGP-LS or PCEP. The controller has a BGP-LS or PCEP neighbor relationship with each node in the SR domain. The controller carries the segment list <R1, R2, R3> and the SL-SID300 by extending a new message in BGP-LS or PCEP, and sends them to each node included in the segment list. The new message may be defined as: SR-LIST Segment ID allocation msg. BGP-LS or PCEP may carry information of the segment list <R1, R2, R3> and the SL-SID300 through the message SR-LIST Segment ID allocation msg, and send them to the nodes R1, R2 and R3.

At act S1104, after receiving the message SR-LIST Segment ID allocation msg carrying the segment list <R1, R2, R3> and the SL-SID300, the nodes R1, R2 and R3 construct the label table item corresponding to the SL-SID.

In the present embodiment, a configuration policy of the constructed label table item specifies that it is not needed to encapsulate the egress label of the packet according to the specific RLD, the constructed label table item is as follows: the ingress label of the SL-SID300 label table item on the SR node is an absolute label that the SR node allocates for the segment list (actually the SRGB of the SR node offsets according to the SL-SID300), the egress label is the absolute label that the next SR node allocates for the segment list (actually the SRGB of the next SR node offsets according to the SL-SID300), and a necessary outer tunnel label is iterated. The outer tunnel may support ECMP/FRR.

The process that each node included in the segment list <R1, R2, R3> constructs the label forwarding table is as follows.

1. After receiving the message, the R1 finds by checking that:

last segment = R3
next segment = R2, then the constructed label forwarding table is as shown in FIG. 12, which is a label forwarding table constructed on the R1 according to a first embodiment of the disclosure.

Because the remote R2 is not the direct connect nexthop, it is possible to iterate the outer label, which may be allocated through the LDP LSP, or the RSVP-TE LSP, or the BGP LSP, or the SR LSP. By taking the SR label for example, the R1 needs to iterate the outer label SRGB_A2 [index_R2].

2. After receiving the message, the R2 finds by checking that:

last segment = R3
next segment = R3, then the constructed label forwarding table is as shown in FIG. 13, which is a label forwarding table constructed on the R2 according to a first embodiment of the disclosure.

3. After receiving the message, the R3 finds by checking that:

last segment=R3, namely the last segment is the node R3 itself, so the R3 does not perform extra processing.

The label forwarding table which has been constructed on the R3 may be shown as FIG. 14, which is a label forwarding table constructed on the R3 according to a first embodiment of the disclosure.

The specific flow of forwarding a packet is as follows.

The segment list in the traffic-bound segment list may be either the egress label stack directly, or the IP address list, namely <R1, R2, R3>. If the segment list is the IP address list, the ingress node may be suggested to convert the IP address list into the egress label stack. A description is given below in the following two cases.

1. The traffic-bound segment list of the ingress node R0 is: <SRGB_A1[index_R1], SRGB_R1[300]>, which may usually be issued by the controller after computation. The format of a data packet carrying the SR packet header which is issued to the ingress node R0 by the controller according to a first embodiment of the disclosure is as shown in FIG. 15.

2. If the ingress node is suggested to convert the IP address list into the egress label stack, the following method may be adopted.

The inner label is obtained by performing offset according to the SL-SID (namely the SL-SID300 allocated for the SL1 in the present embodiment) in the SRGB of the first segment node (namely SRGB_R1 in the present embodiment). In the present embodiment, the inner label is SRGB_R1[300].

The outer label is a forwarding label from the ingress node to the first segment node, and may be the label allocated through the LDP/RSVP-TE/BGP/STATIC/SR LSP. In the present embodiment, the outer label is the SR label, which is obtained by performing offset according to the index (namely index_R1) of the first segment node in the SRGB (namely SRGB_A1) of the direct connect nexthop from the ingress node to the first segment node, namely SRGB_A1[index_R1].

The converted segment list is shown in FIG. 15.

A1: A1 is the direct connect nexthop of the R0. After receiving the packet, the A1 searches the label forwarding table according to the outer label SRGB_A1[index_R1], makes the outer label pop up, and forwards the packet to the node R1. The constructed packet is as shown in FIG. 16. FIG. 16 is a schematic diagram of the format of a data packet carrying the SR packet header which is forwarded to the next node by the node A1 according to a first embodiment of the disclosure.

R1: R1 is the direct connect nexthop of the node A1. After receiving the packet, the R1 searches the label forwarding table (FIG. 12) according to the outer label SRGB_R1[300], switches the outer label to SRGB_R2[index_R3], and forwards packet to the R2. Because the R2 is not the direct connect nexthop of the R1, it is needed to continue to iterate the outer label, which may be the label allocated through the LDP/RSVP-TE/BGP/SR LSP. By taking the SR label for example, the R1 needs to iterate the outer label SRGB_A2[index_R2]. FIG. 17 is a schematic diagram of the format of a data packet carrying the SR packet header which is forwarded to the next node by the R1 according to a first embodiment of the disclosure.

A2: A2 is the direct connect nexthop of the R1. After receiving the packet, the A2 searches the label forwarding table according to the outer label SRGB_A2[index_R2], makes the outer label pop up, and forwards the packet to the R2. FIG. 18 is a schematic diagram of the format of a data packet carrying the SR packet header which is forwarded to the next node by the node A2 according to a first embodiment of the disclosure.

Figure 19:
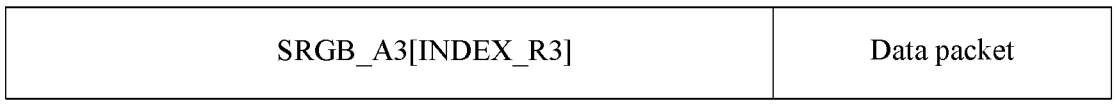
FIG. 19 is a schematic diagram of the format of a data packet carrying an SR packet header which is forwarded to the next node by a node R2 according to a first embodiment of the disclosure.

R2: after receiving the packet, the R2 searches the label forwarding table (FIG. 13) according to the outer label SRGB_R2[index_R3], switches the outer label to SRGB_A3[index_R3], and forwards the packet to the A3. FIG. 19 is a schematic diagram of the format of a data packet carrying the SR packet header which is forwarded to the next node by the node R2 according to a first embodiment of the disclosure.

Figure 20:
FIG. 20 is a schematic diagram of the format of a data packet carrying an SR packet header which is forwarded to the next node by a node A3 according to a first embodiment of the disclosure.

A3: A3 is the direct connect nexthop of the R2. After receiving the packet, the A3 searches the label forwarding table according to the outer label SRGB_A3[index_R3], switches the outer label to SRGB_R3[index_R3], and forwards the packet to the R3. FIG. 20 is a schematic diagram of the format of a data packet carrying the SR packet header which is forwarded to the next node by the node A3 according to a first embodiment of the disclosure.

R3: after receiving the packet, the R3 searches the label forwarding table (FIG. 14) according to the outer label SRGB_R3[index_R3], and makes the outer label pop up; or the R3 makes the outer label pop up early at the penultimate hop.

Second Embodiment

Figure 21:
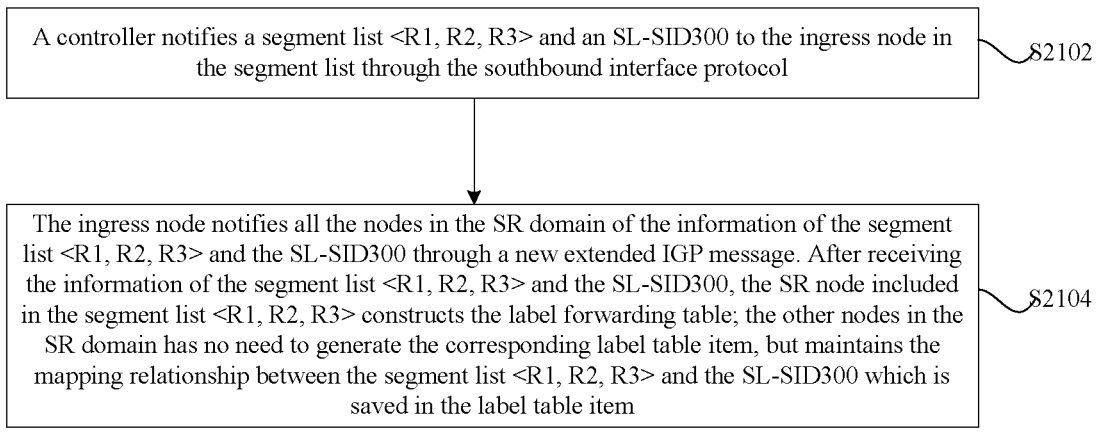
FIG. 21 is a flowchart of explicit routing in the SR network according to a second embodiment of the disclosure.

FIG. 21 is a flowchart of explicit routing in the SR network according to a second embodiment of the disclosure. As shown in FIG. 21, the flow includes the following acts.

At act S2102, the controller notifies a segment list <R1, R2, R3> and an SL-SID300 to the ingress node in the segment list through the southbound interface protocol.

The southbound interface protocol may be BGP-LS or PCEP. The controller has the BGP-LS or PCEP neighbor relationship with each node in the SR domain. The controller carries the segment list <R1, R2, R3> and the SL-SID300 by extending a new message in BGP-LS or PCEP, and sends them to the ingress node in the list. Here, the new message may be defined as: SR-LIST Segment ID allocation msg. BGP-LS or PCEP may carry the information of the segment list <R1, R2, R3> and the SL-SID300 through the message SR-LIST Segment ID allocation msg, and send the information to the ingress node in the list.

At act S2104, the ingress node notifies all the nodes in the SR domain of the information of the segment list <R1, R2, R3> and the SL-SID300 through a new extended IGP message. After receiving the information of the segment list <R1, R2, R3> and the SL-SID300, the SR node included in the segment list <R1, R2, R3> constructs the label forwarding table. The other nodes in the SR domain has no need to generate the corresponding label table item, but maintains the mapping relationship between the segment list <R1, R2, R3> and the SL-SID300 which is saved in the label table item.

For example, if the ingress node needs to compute the label stack according to the IP address list by itself, the controller may also issue the message SR-LIST Segment ID allocation msg to the ingress node. After receiving the message, the R0 maintains the mapping relationship between the SL1 and the SID-300 saved in the label table item.

The construction of the label forwarding tables of all the nodes included in the segment list is the same as the first embodiment, and the specific flow of forwarding a packet is the same as the first embodiment, so please refer to the first embodiment for more details.

Third Embodiment

Figure 22:
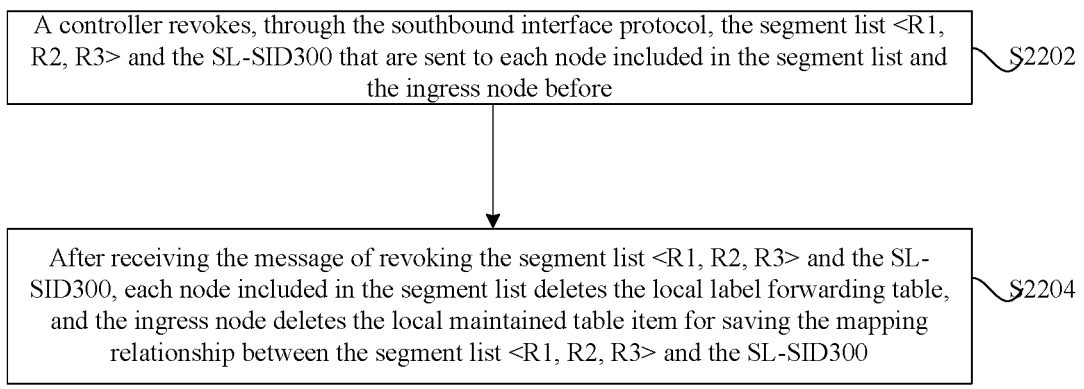
FIG. 22 is a flowchart of explicit routing in the SR network according to a third embodiment of the disclosure.

In the present embodiment, the controller notifies each node included in the segment list <R1, R2, R3> of the segment list <R1, R2, R3> and the SL-SID300 which is notified before the revocation message is revoked. The new revocation message may be defined as SR-LIST Segment ID revocation msg. FIG. 22 is a flowchart of explicit routing in the SR network according to a third embodiment of the disclosure. As shown in FIG. 22, the flow includes the following acts.

At act S2202, the controller revokes, through the southbound interface protocol, the segment list <R1, R2, R3> and the SL-SID300 that are sent to each node included in the segment list and the ingress node before.

The southbound interface protocol may be BGP-LS or PCEP. The controller has the BGP-LS or PCEP neighbor relationship with each node in the SR domain. In the present embodiment, the controller revokes, through an extended BGP-LS or PCEP revocation message, the segment list <R1, R2, R3> and the SL-SID300 that are sent to each node included in the segment list before. The BGP-LS may revoke, through the extended BGP-LS or PCEP revocation message, the segment list <R1, R2, R3> and the SL-SID300 that are sent to each node included in the segment list before.

At act S2204, after receiving the message of revoking the segment list <R1, R2, R3> and the SL-SID300, each node included in the segment list deletes the local label forwarding table, and the ingress node deletes the local maintained table item for saving the mapping relationship between the segment list <R1, R2, R3> and the SL-SID300.

Fourth Embodiment

Figure 23:
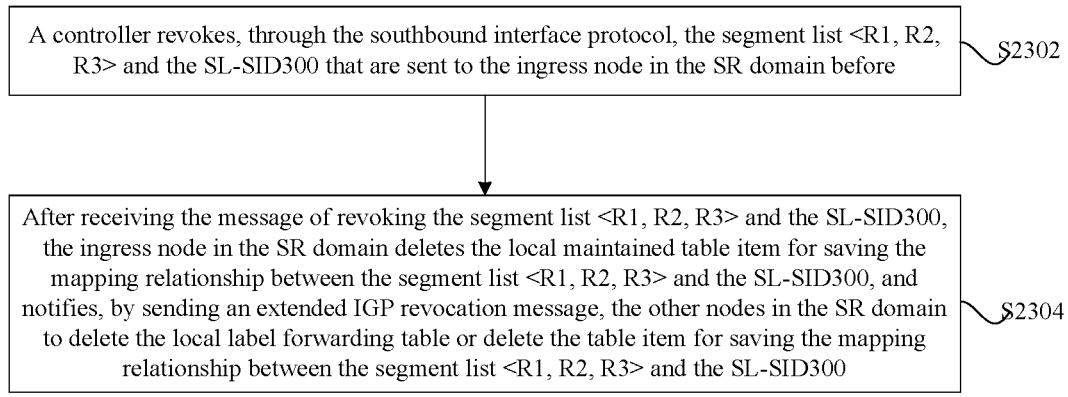
FIG. 23 is a flowchart of explicit routing in the SR network according to a fourth embodiment of the disclosure.

In the present embodiment, the controller notifies the ingress node in the SR domain of the segment list <R1, R2, R3> and the SL-SID300 which is notified before the revocation message is revoked. The new revocation message may be defined as SR-LIST Segment ID revocation msg. FIG. 23 is a flowchart of explicit routing in the SR network according to a fourth embodiment of the disclosure. As shown in FIG. 23, the flow includes the following acts.

At act S2302, the controller revokes, through the southbound interface protocol, the segment list <R1, R2, R3> and the SL-SID300 that are sent to the ingress node in the SR domain before.

The southbound interface protocol may be BGP-LS or PCEP. The controller has the BGP-LS or PCEP neighbor relationship with each node in the SR domain. In the present embodiment, the controller revokes, through the extended BGP-LS or PCEP revocation message, the segment list <R1, R2, R3> and the SL-SID300 that are sent to the ingress node included in the segment list before. The BGP-LS may revoke, through the extended BGP-LS or PCEP revocation message, the segment list <R1, R2, R3> and the SL-SID300 that are sent to each node included in the segment list before.

At act S2304, after receiving the message of revoking the segment list <R1, R2, R3> and the SL-SID300, the ingress node in the SR domain deletes the local maintained table item for saving the mapping relationship between the segment list <R1, R2, R3> and the SL-SID300, and notifies, by sending an extended IGP revocation message, the other nodes in the SR domain to delete the local label forwarding table or delete the table item for saving the mapping relationship between the segment list <R1, R2, R3> and the SL-SID300.

Fifth Embodiment

The present embodiment is basically the same as the first embodiment, and the main difference lies in that the configuration policy of the label table item constructed in the present embodiment specifies that it is needed to encapsulate the egress labels as many as possible for the packet according to the specific RLD.

Figure 24:
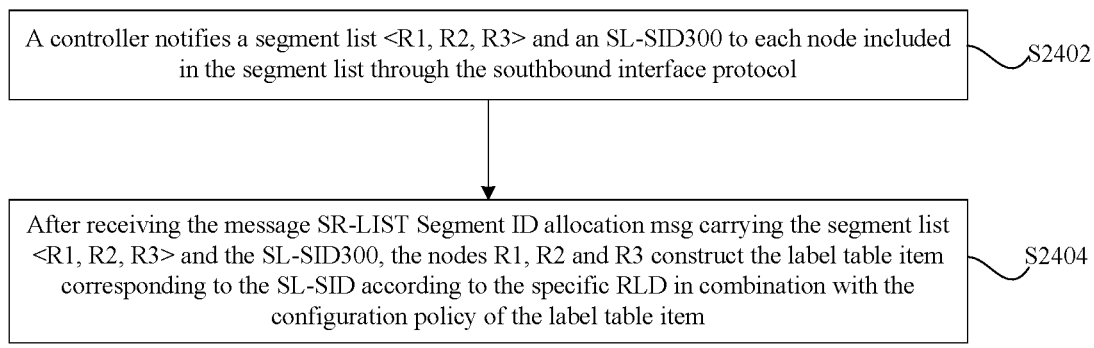
FIG. 24 is a flowchart of explicit routing in the SR network according to a fifth embodiment of the disclosure.

FIG. 24 is a flowchart of explicit routing in the SR network according to a fifth embodiment of the disclosure. As shown in FIG. 24, the flow includes the following acts.

At act S2402, the controller notifies a segment list <R1, R2, R3> and an SL-SID300 to each node included in the segment list through the southbound interface protocol.

The southbound interface protocol may be BGP-LS or PCEP. The controller has the BGP-LS or PCEP neighbor relationship with each node in the SR domain. The controller carries the segment list <R1, R2, R3> and the SL-SID300 by extending a new message in BGP-LS or PCEP, and sends them to each node included in the segment list. Here, the new message may be defined as: SR-LIST Segment ID allocation msg. BGP-LS or PCEP may carry the information of the segment list <R1, R2, R3> and the SL-SID300 through the message SR-LIST Segment ID allocation msg, and send them to the nodes R1, R2 and R3.

At act S2404, after receiving the message SR-LIST Segment ID allocation msg carrying the segment list <R1, R2, R3> and the SL-SID300, the nodes R1, R2 and R3 construct the label table item corresponding to the SL-SID according to the specific RLD in combination with the configuration policy of the label table item,.

The process that each node included in the segment list <R1, R2, R3> constructs the label forwarding table is as follows.

1. After receiving the message, the R1 finds by checking that:

last segment = R3
next segment = R2, then the constructed label forwarding table is shown as follows:
ingress label: SRGB_R1[300];
label operation: SWAP;
FLAG: it is needed to encapsulate the egress label according to the specific RLD;
specific RLD: 5;
for the egress label stack:
outer layer: SRGB_A2[index_R2];
SRGB_R2[index_R3],
inner layer: SRGB_R3[300];
nexthop/port: the shortest path (including ECMP/FRR) to R2, which is single hop A2 in the present embodiment.

2. After receiving the message, the R2 finds by checking that:
last segment=R3
next segment=R3,
then the constructed label forwarding table is shown as follows:
ingress label: SRGB_R1[300],
label operation: SWAP;
FLAG: it is needed to encapsulate the egress label according to the specific RLD;
specific RLD: 5;
for the egress label stack:
outer layer: SRGB_A3[index_R3];
inner layer: SRGB_R3[300];
nexthop/port: the shortest path (including ECMP/FRR) to R2, which is single hop A3 in the present embodiment.

3. After receiving the message, the R3 finds by checking that:
last segment=R3,
then the constructed label forwarding table is shown as follows:
ingress label: SRGB_R3[300];
label operation: POP;
FLAG: label end.

The specific flow of forwarding a packet is as follows.

The segment list in the traffic-bound segment list may be either the egress label stack directly, or the IP address list, namely <R1, R2, R3>. If the traffic-bound segment list is the IP address list, the ingress node is suggested to convert the IP address list into the egress label stack. A description is given below based on several cases.

1. The traffic-bound segment list of the ingress node R0 is the label stack: <SRGB_A1[index_R1], SRGB_R1[300]>, which may usually be issued by the controller after computation. In the present embodiment, it is assumed that the controller still commands the ingress node to encapsulate only the above two layers of SR labels even the controller clearly knows that the specific RLD is equal to 5.

2. If the ingress node needs to convert the IP address list into the egress label stack, the process may be as follows:

1) According to a direct connect nexthop A1 indicated by the shortest path from the ingress node R0 to the first SR node R1, the outermost label SRGB_A1[index_R1] is determined for the R1;

2) The second-outermost label SRGB_R1[index_R2] is determined for the second SR node R2 according to the first SR node R1;

3) The second-outermost label SRGB_R2[index_R3] is determined for the third SR node R3 according to the second SR node R2;

4) If m is equal to 3, the inner label SRGB_R3[300] is determined for the SL-SID300 according to the third SR node R3.

The above process introduces four layers of SR labels. Considering the carried private network service label, the specific RLD may exceed 5. Actually, as a possible implementation, the ingress node may make a more strict control line during the internal implementation, and only two layers of SR labels may be generated, namely producing the result the same as the case when the label is issued by the controller. The specific process may include the followings.

1) According to a direct connect nexthop A1 indicated by the shortest path from the ingress node R0 to the first SR node R1, the outermost label SRGB_A1[index_R1] is determined for the R1.

2) If m is equal to 1, the inner label SRGB_R1[300] is determined for the SL-SID300 according to the first SR node R1.

The converted segment list is as shown in FIG. 15.

A1: A1 is the direct connect nexthop of the R0. After receiving the packet, the A1 searches the label forwarding table according to the outer label SRGB_A1[index_R1], makes the outer label pop up, and forwards the packet to the node R1.

R1: R1 is the direct connect nexthop of the node A1. After receiving the packet, the R1 searches the label forwarding table according to the outer label SRGB_R1[300]. FLAG indicates to encapsulate the egress labels as many as possible, then the entire egress label stack of the label table item may be regarded as the SR label, that is, <SRGB_A2[index_R2], SRGB_R2[index_R3], SRGB_R3[300]>. The packet is sent to the A2.

A2: A2 is the direct connect nexthop of the R1. After receiving the packet, the A2 searches the label forwarding table according to the outer label SRGB_A2[index_R2], makes the outer label pop up, and forwards the packet to the R2.

R2: after receiving the packet, the R2 searches the label forwarding table according to the outer label SRGB_R2[index_R3], switches the outer label to SRGB_A3[index_R3], that is, the entire SR label stack in the packet becomes <SRGB_A3[index_R3], SRGB_R3[300]>, and forwards the packet to the A3. Note that, because the operation of encapsulating the labels as many as possible is performed on the R1 before, the label SRGB_R3[300] corresponding to the SL-SID300 will not be exposed on the R2. Although the similar label table item SRGB_R2[300] is also prepared for the R2 on the SL-SID300, it will not be used in the present embodiment.

A3: A3 is the direct connect nexthop of the R2. After receiving the packet, the A3 searches the label forwarding table according to the outer label SRGB_A3[index_R3], switches the outer label to SRGB_R3[index_R3], that is, the entire SR label stack in the packet becomes <SRGB_R3[index_R3], SRGB_R3[300]>, and forwards the packet to the R3.

R3: after receiving the packet, the R3 searches the label forwarding table according to the outer label SRGB_R3[index_R3], and makes the outer label pop up; or the R3 continues searching the label forwarding table according to the outer label SRGB_R3[300], and makes the label pop up; SRGB_R3[index_R3] may pop up early at the penultimate hop.

Obviously, those skilled in the art should appreciate that the above modules and acts of the disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described acts may be executed in an order different from that described here; or they are made into integrated circuit modules, respectively; or multiple modules and acts of them are made into a single integrated circuit module to realize. In this way, the disclosure is not limited to any particular combination of hardware and software.

The above is only the exemplary embodiment of the disclosure and not intended to limit the disclosure; for those skilled in the art, the disclosure may have various modifications and changes. Any modifications, equivalent replacements, improvements and the like within the principle of the disclosure shall fall within the scope of protection defined by the appended claims of the disclosure.

INDUSTRIAL APPLICABILITY

As mentioned above, a method for constructing a label and forwarding a label packet provided in the disclosure have beneficial effects of lowering the requirement for the label stack processing capacity of the forwarding plane hardware effectively and solving the problem of load efficiency and the MTU problem reasonably.

What is claimed is:

1. A method for constructing a label and forwarding a label packet, comprising:
receiving, by a node, a message which carries a segment list and a segment list Identifier (ID) for identifying the segment list, wherein the segment list ID is a global label or an index, wherein the global label is an index offset when Segment Routing Global Blocks (SRGBs) of all nodes in a Segment Routing (SR) domain are the same;
constructing, by the node, a label forwarding table according to the segment list and the segment list ID, and performing forwarding according to the label forwarding table; and/or, maintaining, by the node, a mapping relationship between the segment list and the segment list ID;

wherein when the segment list ID is an index and the node is not a last node, the node constructs an ingress label according to an SRGB of the node and the segment list ID, and constructs an egress label stack which comprises at least one of the following: an inner label, or one or more outer labels; wherein the inner label is constructed according to an SRGB of a next node of the node and the segment list ID; and the one or more outer labels comprise at least one of the following: a label corresponding to a node ID to which each remaining node corresponds, or a label corresponding to a node ID to which a next node of the node corresponds.

2. The method as claimed in claim 1, wherein the message is sent by an ingress node after the ingress node receives the segment list and the segment list ID sent by a controller; and/or, the message is sent by the controller.

3. The method as claimed in claim 2, wherein,
the node receives the message that the controller sends through a southbound interface protocol, wherein the southbound interface protocol comprises: Broader Gateway Protocol-Link State (BGP-LS), Path Computation Element Communication Protocol (PCEP), open flow protocol (OPENFLOW) or network configuration protocol (Netconf); and/or,
the node receives the message that the ingress node sends through an extended Interior Gateway Protocol (IGP).

4. The method as claimed in claim 1, further comprising:
receiving, by the node, a revocation message sent by a controller or an ingress node, wherein the revocation message is used for indicating the node to delete the mapping relationship between the segment list and the segment list ID, and/or is used for indicating the node to delete the label forwarding table.

5. The method as claimed in claim 1, wherein,
when the node is a last node in the segment list and a previous node of the node does not carry an inner label in a forwarding packet, the node does not construct a label table item in the label forwarding table, wherein the inner label refers to a label that is constructed according to a Segment Routing Global Block (SRGB) of a next node of the node and the segment list ID.

6. The method as claimed in claim 1, wherein when an indicator bit indicates that an egress label is needed to be encapsulated according to a specific Readable Label Depth (RLD), the node constructs the egress label stack, which comprise the one or more outer labels, according to the specific RLD.

7. The method as claimed in claim 1, wherein the specific RLD is greater than or equal to 2; when the node encapsulates a label stack of a packet, a depth of the label stack is not greater than the specific RLD.

8. The method as claimed in claim 7, wherein the specific RLD is configured explicitly, or is a network-wide minimum value obtained by learning.

9. The method as claimed in claim 8, wherein,
nodes between the node and a next node of the node comprise at least one of the following: an SR node and/or a non-SR node; and/or,
tunnels between the node and a next node of the node comprise at least one of the following: a Label Distribution Protocol Label Switching Path (LDP LSP), a Resource Reservation Protocol-Traffic Engineering LSP (RSVP-TE LSP), a BGP LSP, or an SR LSP.

10. The method as claimed in claim 1, wherein when the segment list ID is an index and the node is the ingress node,
if an indicator bit indicates that an egress label is needed to be encapsulated according to a specific Readable Label Depth (RLD), an ingress node constructs an egress label stack which comprises at least one of the following: an inner label, or one or more outer labels; wherein the inner label is constructed according to the segment list ID and an SRGB of a farthest node in the segment list which is able to be encapsulated in a scope limited by the specific RLD; the one or more outer labels are as follows from outside to inside: a label corresponding to a first node in the segment list, which is determined according to a direct connect nexthop indicated by a shortest path from the ingress node to a first node in the segment list; labels corresponding to nodes from a second node to an mth node in the segment list, each of which is determined according to a previous node of this node in the segment list, wherein the mth node is determined according to the farthest node in the segment list which is able to be encapsulated in the scope limited by the specific RLD;
or,
if an indicator bit indicates that an egress label is not needed to be encapsulated according to a specific Readable Label Depth (RLD), an ingress node constructs an egress label stack which comprises at least one of the following: an inner label or an outer label; wherein the inner label is constructed according to an SRGB of a first node except the ingress node in the segment list and the segment list ID, and the outer label is determined according to a direct connect nexthop indicated by a shortest path from the ingress node to a first node except the ingress node in the segment list.

11. The method as claimed in claim 10, wherein
when the farthest node in the segment list which is able to be encapsulated in the scope limited by the specific RLD is a last node in the segment list, the egress label stack does not comprise the inner label.

12. The method as claimed in claim 10, wherein,
when the first node except the ingress node in the segment list is also a last node in the segment list, the egress label stack does not comprise the inner label.

13. The method as claimed in claim 1, wherein when the segment list ID is an index and the node is a node except the ingress node in the segment list,
if an indicator bit indicates that an egress label is not needed to be encapsulated according to a specific Readable Label Depth (RLD), an egress label stack constructed by the node comprises at least one of the following: an inner label or one outer label; wherein the inner label is constructed according to an SRGB of a next node of the node and the segment list ID, and the outer label is constructed according to an SRGB of a direct connect nexthop indicated by a shortest path from the node to a next node of the node and an ID of the next node;
or,
if an indicator bit indicates that an egress label is needed to be encapsulated according to a specific Readable Label Depth (RLD), a node i constructs an egress label stack which comprises at least one of the following: an inner label, or one or more outer labels; wherein the inner label is constructed according to the segment list ID and an SRGB of a farthest node m in the segment list which is able to be encapsulated in a scope limited by the specific RLD; the one or more outer labels are as follows from outside to inside: a label corresponding to a next node i+1 of the node i, which is determined according to a direct connect nexthop indicated by a shortest path from the node i to the next node i+1 of the node i; and labels corresponding to nodes from a node i+2 to a node m in the segment list, each of which is determined according to a previous node of this node in the segment list; wherein the node i is a node except the ingress node in the segment list, and the node m is determined according to the farthest node in the segment list which is able to be encapsulated in the scope limited by the specific RLD.

14. The method as claimed in claim 13, wherein, when the farthest node in the segment list which is able to be encapsulated in the scope limited by the specific RLD is a last node in the segment list, the egress label stack does not comprise the inner label.

15. The method as claimed in claim 1, wherein when the segment list comprises only one node, the segment list ID is a node ID of the node.

16. A device for constructing a label and forwarding a label packet, which is applied to a node and comprises a hardware processor arranged to execute program modules comprising:
a first receiving module, configured to receive a message which carries a segment list and a segment list Identifier (ID) for identifying the segment list, wherein the segment list ID is a global label or an index, wherein the global label is an index offset when Segment Routing Global Blocks (SRGBs) of all nodes in a Segment Routing (SR) domain are the same; and
a constructing module, configured to construct a label forwarding table according to the segment list and the segment list ID, and perform forwarding according to the label forwarding table; and/or, the constructing module is configured to maintain a mapping relationship between the segment list and the segment list ID;
wherein when the segment list ID is an index and the node is not a last node, the constructing module is configured to construct an ingress label according to an SRGB of the node and the segment list ID, and construct an egress label stack which comprises at least one of the following: an inner label, or one or more outer labels; wherein the inner label is constructed according to an SRGB of a next node of the node and the segment list ID; and the one or more outer labels comprise at least one of the following: a label corresponding to a node ID to which each remaining node corresponds, or a label corresponding to a node ID to which a next node of the node corresponds.

17. A device for constructing a label and forwarding a label packet, which is applied to a controller and comprises a hardware processor arranged to execute program modules comprising:
a first sending module, configured to send a message to a node, wherein the message carries a segment list and a segment list Identifier (ID) for identifying the segment list, the segment list ID is a global label or an index, wherein the global label is an index offset when Segment Routing Global Blocks (SRGBs) of all nodes in a Segment Routing (SR) domain are the same, and the segment list and the segment list ID are used for indicating the node to construct a label forwarding table and perform forwarding according to the label forwarding table; and/or, the segment list and the segment list ID are used for indicating the node to maintain a mapping relationship between the segment list and the segment list ID;
wherein when the segment list ID is an index and the node is not a last node, the segment list and the segment list ID are used for indicating the node to construct an ingress label according to an SRGB of the node and the segment list ID, and construct an egress label stack which comprises at least one of the following: an inner label, or one or more outer labels; wherein the inner label is constructed according to an SRGB of a next node of the node and the segment list ID; and the one or more outer labels comprise at least one of the following: a label corresponding to a node ID to which each remaining node corresponds, or a label corresponding to a node ID to which a next node of the node corresponds.

18. A device for constructing a label and forwarding a label packet, which is applied to an ingress node and comprises a hardware processor arranged to execute program modules comprising:
a third receiving module, configured to receive a message sent by a controller, wherein the message carries a segment list and a segment list Identifier (ID) for identifying the segment list, and the segment list ID is a global label or an index, wherein the global label is an index offset when Segment Routing Global Blocks (SRGBs) of all nodes in a Segment Routing (SR) domain are the same; and
a third sending module, configured to send the message to a node, wherein the message is used for indicating the node to construct a label forwarding table and perform forwarding according to the label forwarding table; and/or, the message is used for indicating the node to maintain a mapping relationship between the segment list and the segment list ID;
wherein when the segment list ID is an index and the node is not a last node, the message is used for indicating the node to construct an ingress label according to an SRGB of the node and the segment list ID, and construct an egress label stack which comprises at least one of the following: an inner label, or one or more outer labels; wherein the inner label is constructed according to an SRGB of a next node of the node and the segment list ID; and the one or more outer labels comprise at least one of the following: a label corresponding to a node ID to which each remaining node corresponds, or a label corresponding to a node ID to which a next node of the node corresponds.

* * * * *